No. 769,322. PATENTED SEPT. 6, 1904.
G. W. PACKER.
FOUNDRY SYSTEM.
APPLICATION FILED JULY 10, 1901.
NO MODEL. 8 SHEETS—SHEET 1.

WITNESSES:
INVENTOR.
BY Geo. W. Packer
Elliott & Hopkins
ATTORNEYS

No. 769,322. PATENTED SEPT. 6, 1904.
G. W. PACKER.
FOUNDRY SYSTEM.
APPLICATION FILED JULY 10, 1901.
NO MODEL.
8 SHEETS—SHEET 3.

No. 769,322.                                                    Patented September 6, 1904.

UNITED STATES PATENT OFFICE.

GEORGE W. PACKER, OF CHICAGO, ILLINOIS.

FOUNDRY SYSTEM.

SPECIFICATION forming part of Letters Patent No. 769,322, dated September 6, 1904.

Application filed July 10, 1901. Serial No. 67,764. (No model.)

*To all whom it may concern:*

Be it known that I, GEORGE W. PACKER, a citizen of the United States, residing at Chicago, in the county of Cook and State of Illinois, have invented certain new and useful Improvements in Foundry Systems, of which the following is a full, clear, and exact specification.

My invention relates to a foundry system for separating the castings from the molds and retempering the sand, and more particularly to one in which the molds are conducted to the place for receiving the metal and the resultant castings are subsequently separated from the mold and the sand dampened or retempered for restoring thereto the moisture lost therefrom during the casting operation, the molds being carried from the ladler's stand to a screening device which separates the castings from the sand and the core-wires from the castings by means of mold-carriers supported on an endless conveyer.

The invention has for one of its important objects to advance the mold to the place for receiving the metal and automatically clamp and securely hold it while the metal is being poured therein and to thereafter conduct it away to give place to a succeeding mold.

Another object of the invention is to provide improved means for conducting the filled mold to a place to be dumped during the time required for cooling or solidifying the casting and to automatically disintegrate the mold and separate the sand from the casting while the mold-conveyer moves on its way back to the place where it receives another mold.

Another object of the invention is to arrange the system in such a manner as to occupy only the minimum amount of floor-space and at the same time have it entirely accessible to the operators as far as necessary.

Another object of the invention is to automatically retemper the sand after the castings have been shaken out and to avoid the accumulation of surplus moisture in any part thereof, whereby the sand will be of uniform consistency throughout.

A still further object of the invention is to provide means for intimately commingling the sand with steam, whereby it will be uniformly tempered or dampened and overwetting will be avoided.

With these ends in view my invention consists in certain features of novelty in the construction, combination, and arrangements of parts by which the said objects and certain other objects hereinafter appearing are attained, all as fully described, with reference to the accompanying drawings, and more particularly pointed out in the claims.

In the said drawings, Fig. 3$^a$ is a plan view thereof.

According to this invention the molds are placed upon carriers which are supported and carried by an endless conveyer, one part of which is arranged in an upright position, while the other part extends overhead in a horizontal direction for conducting the molds to the place where they are dumped from the carriers into suitable screening devices for separating the sand and the castings and retempering or dampening the sand. This conveyer is given an automatic intermittent motion, so that an operator on one side of the upright part may be afforded an opportunity to place the molds on the carriers as they pass him, while an operator standing on the opposite side of said upright part is afforded an opportunity to pour the metal into the molds as they pass him, and which molds after being filled are retained on the conveyer a sufficient length of time to allow the castings to solidify to a sufficient degree to make it safe to disintegrate the mold, each mold as it passes the ladler being automatically clamped and firmly held to prevent bursting or expansion during the pouring operation.

Figures 1, 2, 3, 4:
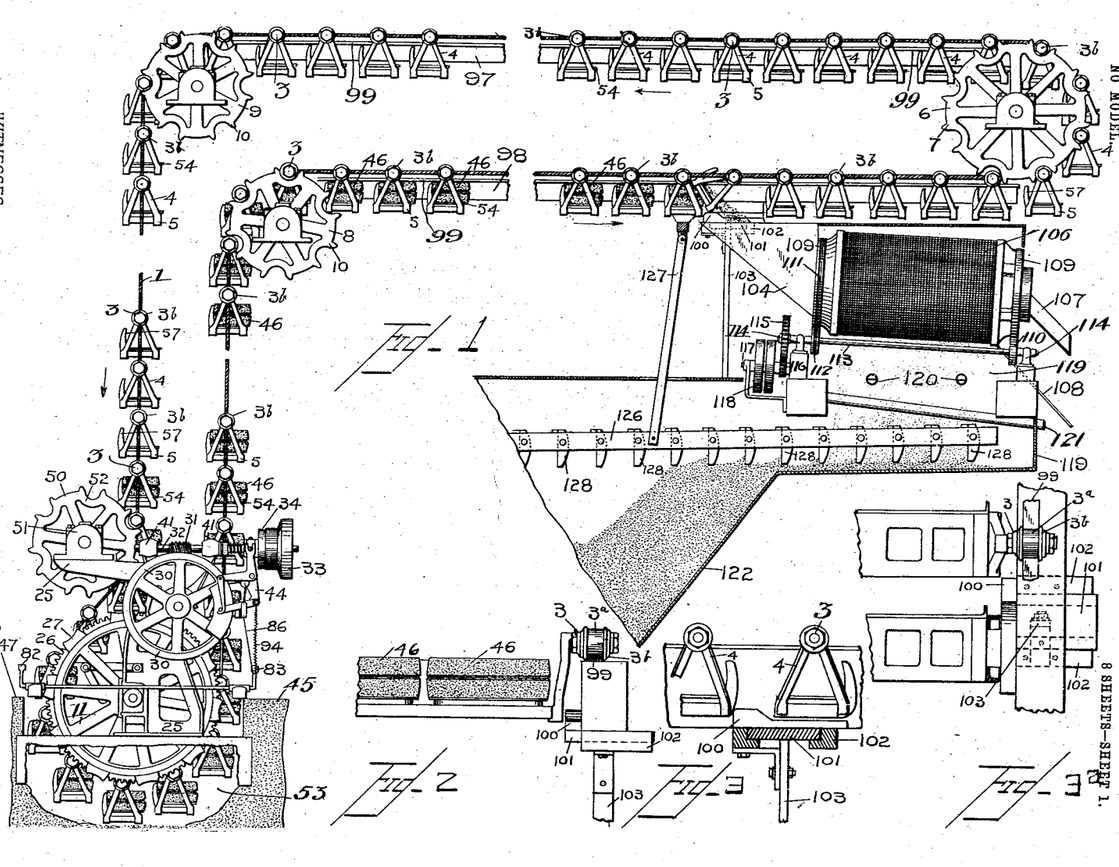
Figure 1 is a side elevation of my improved system, partly broken away and partly in vertical section.
Fig. 2 is an enlarged side elevation or front view of one end of one of the mold-carriers, showing it supported on one of the horizontal ways or rails.
Fig. 3 is a detail view of the mold-carrier trip, hereinafter described, showing the relation of the mold-carriers thereto.
Fig. 4 is a front elevation of the lower part of the apparatus, showing the foundation in section.
Figure 4:
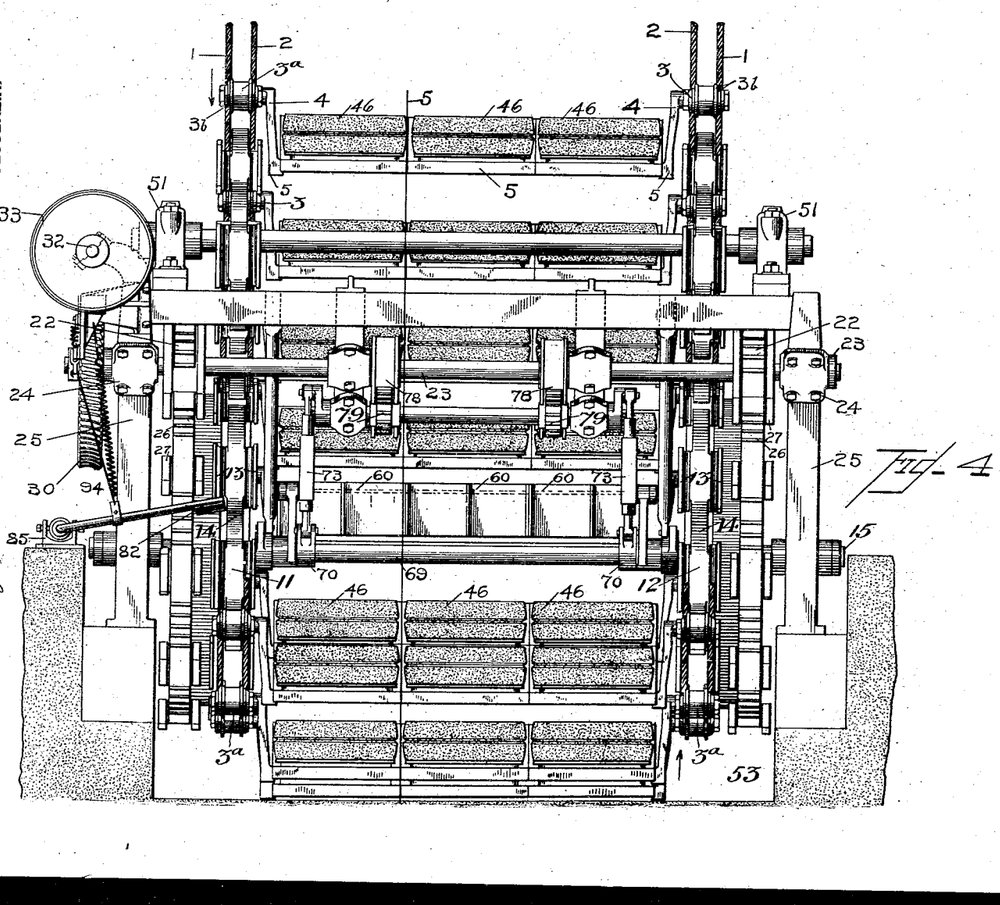

The aforesaid conveyer preferably consists of two pairs of cables or belts 1 2, arranged close together, as better shown in Fig. 4, and to each pair of these belts is secured at short intervals a number of lugs 3, which constitute the pivotal supports for the swinging arms 4, located at opposite ends of each of the mold-carriers 5. These lugs 3 are clamped at opposite ends to the cables 1 and 2 in any suitable manner that will give the mold-carriers secure connection with the conveyer, and the lugs constitute means for enabling the driving-wheels which propel the conveyer to grip the conveyer and advance it with a positive movement. The upper end of the conveyer where it is arranged in a horizontal position, as aforesaid, passes over a pair of idlers 6, whose periphery is provided with sockets or sprockets 7, into which the lugs 3 engage, and at the points where the folds of the conveyer turn from a vertical to a horizontal position are arranged two pairs of other idlers 8 9, having similar sprockets 10 for the engagement of the lugs 3, the purpose of the sockets or sprockets 7 10 on these idlers, however, being mainly for the accommodation of the lugs, so that the cables will conform to the peripheries of the idlers rather than for any propelling action that they might have on the idlers or the idlers on them.

Figures 9, 10, 11:
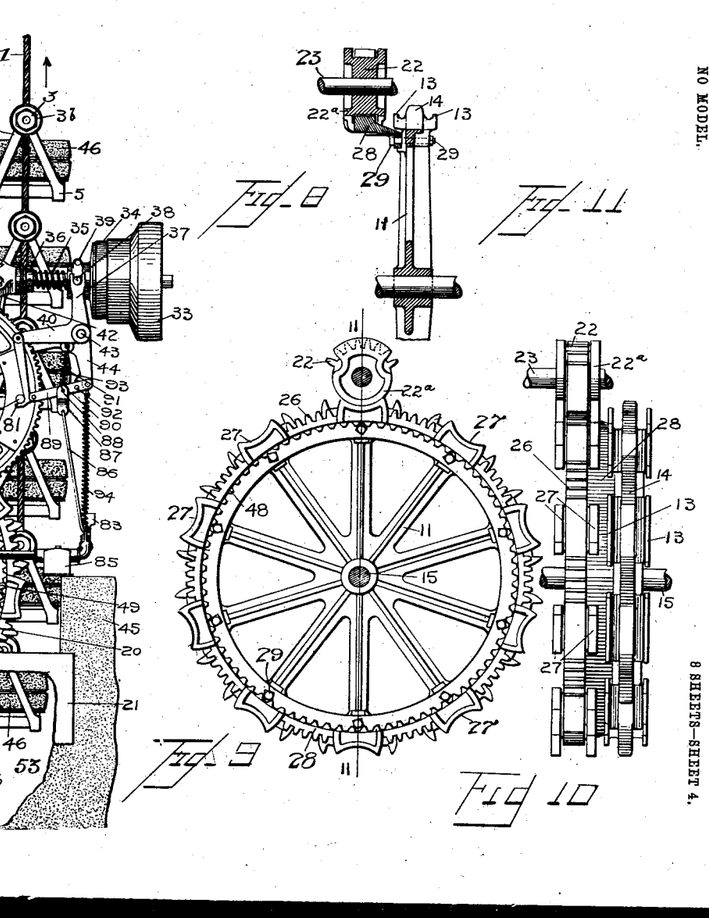
Fig. 9 is a detail side elevation of one of the multilated gears and the multilated pinion which drives the same.
Fig. 10 is a peripheral view thereof.
Fig. 11 is a detail section thereof, taken on the line 11 11 of Fig. 9, the lower half of the gear being omitted.

Arranged at the lower end of the upright portion of the conveyer and respectively in line with the two idlers 9 are two rotary members or wheels 11 12, around which the double belts 1 2 pass, respectively. The peripheries of the wheels 11 12 are formed with short side flanges 13, as better shown in Fig. 10, which receive the cables 1 2 between them and avoid the possibility of the cable slipping out of place, and at the spaces between the ends of these flanges 13 are arranged curved seats or sprockets 14, which receive the lugs 3 and in conjunction with said lugs impart motion to the conveyer when the wheels 11 12 are rotated. The wheels 11 12 are preferably keyed upon an axle 15, which is supported at each end in a collar 16, arranged between upper and lower adjusting-screws 17 18, whereby the elevation of the shaft of the axle 15 may be changed or its ends independently adjusted, as may be required. The screws 18 are mounted in any suitable support 19, formed on main frame member 20, which is supported on a suitable brace or beam 21.

Power is imparted to both of the wheels 11 12 simultaneously from a pair of pinions 22, rigidly secured to a shaft 23, journaled in suitable bearings 24 on main frame members 25. The pinions 22 are mutilated or provided with teeth on one side only, the opposite side being a plain circular surface $22^a$, and they engage with mutilated gears formed on or secured to the wheels 11 12, respectively. Said mutilated gears are many times greater in diameter than the pinions 22 and are each composed of alternating toothed surfaces 26 and plain or mutilated surfaces 27, the surfaces 26 27 alternately engaging, respectively, with the teeth and plain surface of pinion 22, so that when the teeth of the pinion are out of engagement with the teeth of the gear the gear will be locked against further rotation by the plain surface $22^a$ of the pinion. Each of these mutilated gears 26 27 is shown in the drawings in the form of a ring 28, secured by bolts 29 to the outer side of each of the wheels 11 12, thus making the said wheels serve the twofold purpose of carrying the conveyer and the mutilated gears; but any other suitable arrangement whereby the motion of the pinions 22 will be imparted intermittently to the wheels 11 12 will answer the purpose.

Figures 5, 6:
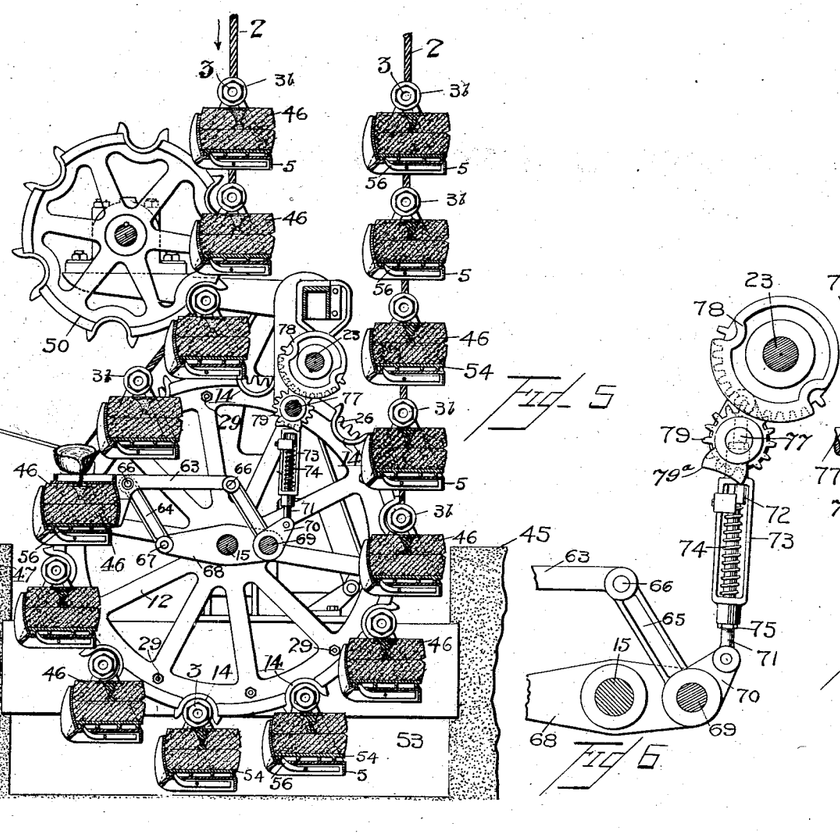
Fig. 5 is a vertical transverse section thereof, taken on the line 5 5 of Fig. 4.
Fig. 6 is an enlarged detail view of a part of the mechanism for actuating the mold-clamp looking from the side as in Fig. 5.
Figure 7:
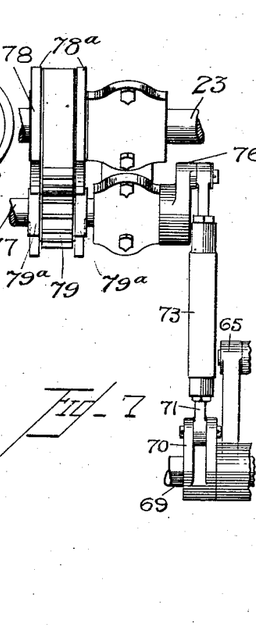
Fig. 7 is a front view thereof looking from the right as in Fig. 5.
Figure 8:
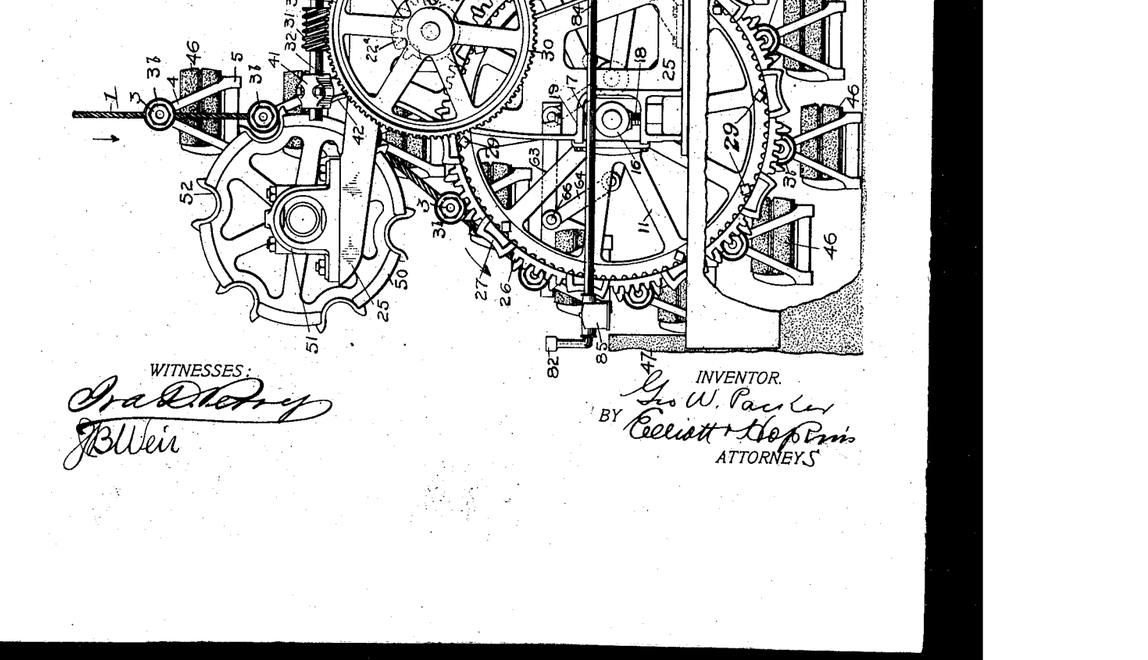
Fig. 8 is a view similar to Fig. 5, showing the apparatus in elevation and the foundation in section and partly broken away.

The shaft 23 derives motion from worm-wheel 30, secured thereto, as better shown in Figs. 5 and 8, and meshing with a worm 31, secured to driving-shaft 32, which derives motion from a clutch whose driving member 33 is connected to any suitable source of power (not shown) and loose on the shaft 32, while the driven member 34 of said clutch is secured to shaft 32 with capability of sliding longitudinally thereon, in a well-known manner, and imparts motion to said shaft when the clutch members are in engagement. The clutch members are normally held in engagement by means of coil-spring 35 or other suitable device acting between collar 36 and clutch member 34, and clutch member 34 is held out of engagement when desired by means of a bell-crank lever whose arm 37 is connected by a pin 38 to collar 39 on clutch member 34, while arm 40 of said bell-crank is operatively connected to an automatic trip for throwing the clutch out of action at the proper time and also to a manually-actuated trip or releasing device for starting the machine at the will of the operator, as will be hereinafter described. The shaft 32 is mounted in suitable bearings 41 on main frame member 42, and bell-crank 37 40 is pivoted at 43 to a bracket 44 on main frame member 25.

With the construction described it will be seen that when motion is imparted to the pinions 22 they will impart to the wheels 11 and 12, respectively, a partial or intermittent rotation each time the teeth of the pinions come into engagement with the short sections of toothed surfaces on the wheels 11 12, and consequently the entire series of connected carriers 5 will be advanced intermittently or given a step-by-step motion, one side of the continuous conveyer coming up while the other goes down, thus enabling an attendant standing at 45 on one side of the upright portion of the conveyer to place the molds 46 upon the carriers 3 as they pass him and another attendant on the opposite side at 47 to pour the metal into the molds as they successively become accessible to the ladle or pouring device after passing entirely around the endless series of carriers from the point 45, the pinions 22 and toothed surfaces 26 of the mutilated gears being so proportioned relatively to the distance between the carriers 5 that the conveyer will be advanced at each step a distance equal to the distance between said carriers, whereby the carrier to be loaded or the mold to be filled will always stop at substantially the same place. It will also be seen that at the completion of each advancing operation of the conveyer the wheels 11 12 will be positively locked against retrograde movement or accidental rotation by the plain surfaces 22ª of the pinions 22 coming into engagement with the plain surface 27 of the mutilated gears. In order, however, to further guard against backward or retrograde motion, the inner peripheries of the rings 28 may be provided with teeth 48 on both of the wheels 11 12, with each of which engages a pawl 49, capable of arresting the rotation of the wheels 11 12 in one direction, but permitting them to move in the opposite direction.

In order that each succeeding mold may be held from under the mold immediately above it, so as to render the same accessible to the ladle of the ladler, the line of carriers just above the ladler's stand 47 is deflected inwardly or away from said stand, as better shown in Fig. 5. This may be accomplished by means of an idler 50, supported in suitable bearings 51 on each of the frame members 25 and, like the idlers 9, having sprockets or sockets 52 engaging the conveyer-belts 1 2 and lugs 3 on each side of the machine, so as to press the conveyer inwardly over the wheels 11 12, and thus cause the carriers 5 on the inclined part of the conveyer to swing inwardly from over the mold which is directly opposite and substantially level with the ladler's stand 47, the swinging carriers being capable of swinging freely between the wheels 11 12 and, in fact, all of the idlers before described. To the end that the mold to be filled may be substantially on a level with the floor, and thus avoid the necessity of lifting the ladle to an inconvenient elevation, the wheels 11 12 are depressed or let into the cavity 53 in the floor, so that the ladler's stand 47 will be substantially opposite or in line with the horizontal diameter of the wheels 11 12 and the molds will stop for receiving the metal at a point substantially on a level with the stand 47, this method being preferred to building up the ladler's stand.

After each of the molds 46 is formed it is placed on a bottom board 54, in order that it may be conveniently handled and placed on the carriers 5 without danger of damage, and the bottom boards 54 and the carriers are provided with means whereby the boards will be automatically locked in place on the carriers when once set thereon by the operator. As better shown in Fig. 13, the bottom of the carrier is provided with an aperture 55, through which projects a latch 56, which engages with one of the ribs 57, formed on the bottom of the bottom board for the sake of strength, said latch being normally forced upwardly by a spring 58, having one end secured to the latch and the other end pressed against the bottom of the carrier, the latch being pivoted at 59 to a suitable support on the bottom of the carrier. As the bottom board is pushed upon the carrier its inner edge is engaged under a lug 57ˣ, formed on the back of the carrier and which holds the board down. With the construction shown it will be seen that when the bottom board is placed on the carrier and pushed toward it the forward or innermost one of the ribs 57 will engage and depress the latch 56, and by the time the edge of the bottom board comes against the upright side of the carrier the rib 57 will have passed over the latch, which will spring upwardly against the rib and prevent the bottom board from being pulled off laterally.

Figure 12:
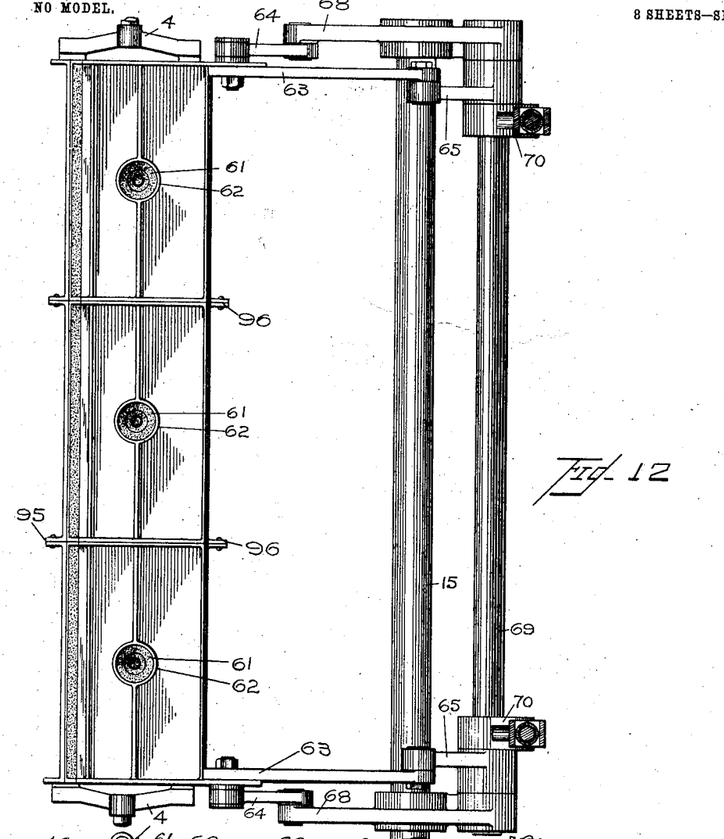
Fig. 12 is an enlarged plan view of the mold-clamp, showing it in position on the molds.
Figure 13:
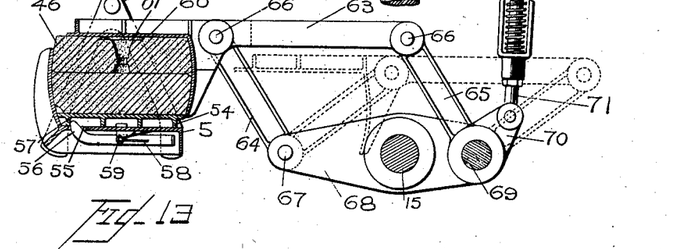
Fig. 13 is an end view thereof.
Figures 14, 15, 16:
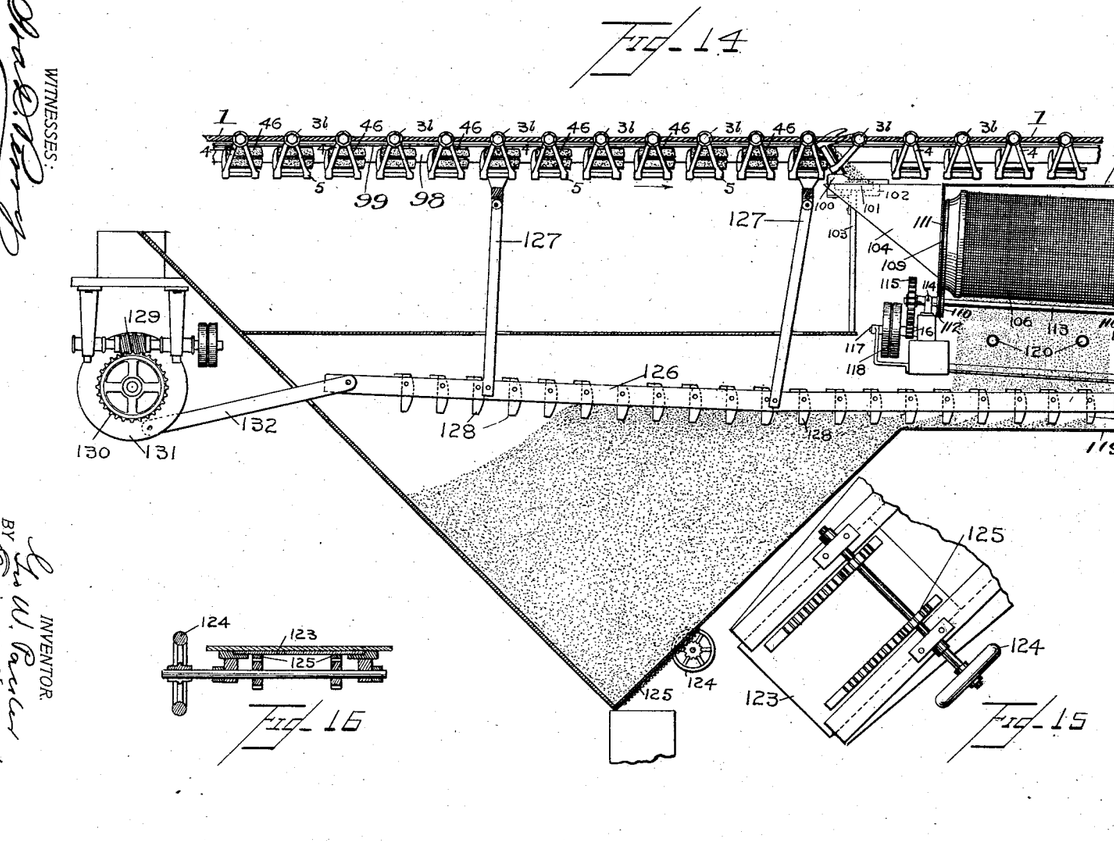
Fig. 14 is a vertical longitudinal sectional view of the upper part of the system, illustrating the sand-tempering devices and hopper or chute for receiving the sand from the tempering-chamber.
Fig. 15 is a detail face view of the lower end of said hopper or chute, showing the valve or gate for guarding the discharge-aperture at the bottom thereof.
Fig. 16 is a transverse section of said valve or gate and its operating mechanism.

While the metal is being poured into the mold it is desirable to clamp and hold the mold more securely than is accomplished by means of the carrier alone, and for this purpose the clamping mechanism, (better shown in Figs. 12 and 13,) is employed. As indicated in Fig. 13, the carries 5 is an L-shaped member in cross-section, with one portion passing under the mold and the other portion passing up one side thereof, preferably the outer side or the side near the ladler, but the side farthest from the attendant, who stands on the opposite side of the apparatus for placing the mold on the carrier. The clamp proper for embracing the top and the opposite side of the mold is shown at 60, and it is L-shaped in cross-section, constituting a counterpart of the carrier 5, but arranged in a reverse position, so as to embrace the corner diagonally opposite that corner of the mold embraced by the carrier. This clamp is adapted to come down on the top of the mold as it rests on the carrier and be pressed downwardly and laterally, so as to hold the mold firmly against the upright side of the carrier and also support that side of the mold which is opposite said upright side, while preventing the upper mold member from floating on the metal or leaving its position of intimate contact with its companion member. The metal is poured into the sprue 61 through a sprue-aperture 62 in the top of the clamp 60. The clamp is provided at each end with a horizontal arm 63, which may be formed thereon or secured thereto, and this arm is held in a horizontal position, so as to hold the clamp horizontally and at the same time force it downwardly and laterally, as aforesaid, by means of a pair of arms or links 64 65, whose upper ends are pivoted at 66 to the arm 63, while the lower end of arm 64 is pivoted at 67 to one end of a bracket-arm 68, and the lower end of arm 65 is virtually pivoted to the opposite end of bracket-arm 68 by being secured to a rocker-shaft 69, which is journaled in said bracket-arm 68, it being understood that the arms 64 65 thus pivoted on parallel axes are duplicated at opposite ends of the mold-clamp, as shown in Fig. 12, so that both ends of the mold-clamp may be removed or supported positively without danger of torsional motion. At each end of the rocker-shaft 69 is secured a short crank-arm 70, to each of which is pivoted the lower end of a rod 71, whose upper end carries a head 72, (see Fig. 6,) sliding in a link 73, between the inner end of which and said head bears a coil-spring 74, which is sleeved on the rod 71 in such a manner as to be compressed when the link 73 is pulled upwardly, and thus impart motion to the clamp 60 through the intermediary of the said spring. The purpose of this is to allow for excessive motion of the clamp-operating mechanism, presently to be described, without danger of crushing the mold and at the same time insuring that the clamp will in every instance press the mold with sufficient force to accomplish the desired object. When the link 73 is pulled upwardly, the clamp is forced laterally and downwardly against the mold through the intermediary of the spring 74, as just described, and when the link is forced downwardly it comes against a shoulder 75 on the rod 71 and returns the clamp 60 with a positive movement to its retracted position, as shown in dotted lines in Fig. 13. These motions are imparted to the link 73 by cranks 76, one of which is secured to each end of a shaft 77, (see Fig. 4,) which derives motion from mutilated pinions 78, secured to the shaft 23 and engaging with smaller pinions 79 on the shaft 77. The toothed portion of each of the pinions 78 is of sufficient extent to impart a complete rotation to the pinion 79, with which it engages, but said toothed portions of the pinions 78 are so arranged with relation to the toothed portions of pinions 22, which are secured to shaft 23, that when the shaft 23 ceases its rotation the toothed portion of pinion 78 will be half way past pinion 79, and at this time the crank 76 will be at the limit of its upward movement, as shown in Fig. 6, and consequently the mold-clamp 60 will be down in firm engagement with the mold, as shown in Fig. 13, where it will remain at the option of the operator, who may cause it to recede back into its retracted position between the wheels 11 12 for permitting the filled molds to pass out of the way and give place to the next succeeding mold. This stopping of the clamp 60 upon the mold is accomplished automatically by means of a lug 80 or other suitable device, secured to or moving in unison with the worm-wheel 30 and serving, by means which will now be described, to throw the driven clutch member 34 out of engagement with its companion member 33 at the completion of each operation, or, in other words, as soon as the mold-advancing mechanism has brought a new mold into position for receiving the metal and the clamp-actuating mechanism has brought the clamp down firmly into engagement with such mold.

The mold-advancing mechanism or the wheels 11 12 engaging their respective conveyer-belts of course operate in advance of the clamp-actuating mechanism, which latter begins to operate after the plain surface 22$^a$ of the pinions 22 comes into engagement with and locks the mutilated gears 26 27; but both of these operations are produced while the worm gear-wheel 30 is making one complete rotation and carrying its lug 80 from the position shown in Fig. 8, where it is in engagement with a hook 81, pivoted to bell-crank arm 40 and holding clutch member 34 out of engagement with member 33. The hook 81 is normally arranged within the circle of movement of the lug 80, so as to inevitably be struck thereby for causing the clutch members to disengage and depriving worm-wheel 30 of further rotative power. After the hook 81 has arrested the lug 80 the lug remains in engagement with the hook until released by the operator on either side of the apparatus. For accomplishing this a treadle 82 is provided at a point convenient to the ladler, so that after the ladler has filled the mold he may disengage the trip mechanism from lug 80, whereupon the spring 35 will throw the clutch members into engagement, and the shaft 23 will impart motion through the agency of its connected members, first, to the mold-clamp for retracting it from the mold and then to the wheels 11 and 12 for carrying that mold out of the way and bringing another one in place, it being seen by reference to Fig. 6 that the instant shaft 23 starts to rotate the balance or remaining one-half of the toothed portion of pinion 78 will instantly begin acting upon pinion 79 for retracting the mold-clamp and will continue to rotate pinion 79 until a locked or grooved shoe 79$^a$ on pinion 79 turns into engagement with a plain ridge 78$^a$ or mutilated pinion 78, thus holding pinions 79 and their shafts 77 against rotation. Another foot-treadle 83 is arranged adjacent to the operator's stand 45 and connected to the treadle 82 by shaft 84, supported in suitable bearings 85 and connected by a rod 86 to the hook 81 through the agency of a clevis or link 87, which is pivoted to the joint 88 of two short links 89 90, which constitute a toggle whose outer ends are pivoted to hook 81 and bracket 44, respectively, as shown in Fig. 8. The joint or pivotal point 88 of the toggle is supported by a spring 91, secured to bracket 44 and serving to hold hook 81 normally in the path of lug 80; but when either of the treadles 82 83 is depressed the toggles will be bent and hook 81 consequently pulled out of engagement with lug 80, springs 35, however, being of a power greater than spring 91 to force clutch member 34 into engagement with clutch member 33 notwithstanding the tension of spring 91. The joint of the toggle 88 is limited in its upward motion by means of a stop-pin 92, projecting from link 90 and adapted to engage with a shoulder 93 on bracket 44, and the foot-treadles 82 83 are raised to their normal positions by a spring 94, secured to bracket 44.

The mold-carriers may be of any desired length, so as take one or more molds. In the example of the invention shown in the drawings they are made of sufficient length to accommodate three molds, and they are composed of short sections having flanges 95 bolted or riveted together, the mold-clamp 60 being also composed of short sections having flanges 96 bolted or riveted together.

The upper or horizontal part of the conveyer is supported by upper and lower tracks or ways 97 98, which engage under the lugs 3, and the lugs 3 are preferably provided with antifriction-rollers 3$^a$, which rest upon raised portions 99 on the ways 98 and have side flanges 3$^b$ engaging with the edges of portion 99 for holding the lugs against lateral motion and avoiding the possibility of the carrier striking the sides of the ways 97 98. (See Fig. 2.) Arranged under the lower ways 99 on one side of the conveyer is a trip 100, which is so located as to engage the edges of the carriers 5 as they advance and tip them sufficiently to dump the mold therefrom. Inasmuch, however, as it is desirable to have the molds pass the trip 100 once on their way to the ladler's stand 47 to be filled this trip 100 is so arranged that it may be pushed to one side of the line of movement of the carriers. (See Figs. 2 and 3$^a$.) After the molds are filled it is pushed back again for dumping them. Any suitable mechanism for accomplishing this may be resorted to. The drawings illustrate a slide 101, to which the trip 100 is secured, and which slide is mounted in guides 102 and is operated by a lever 103 from any suitable point.

Figure 17:
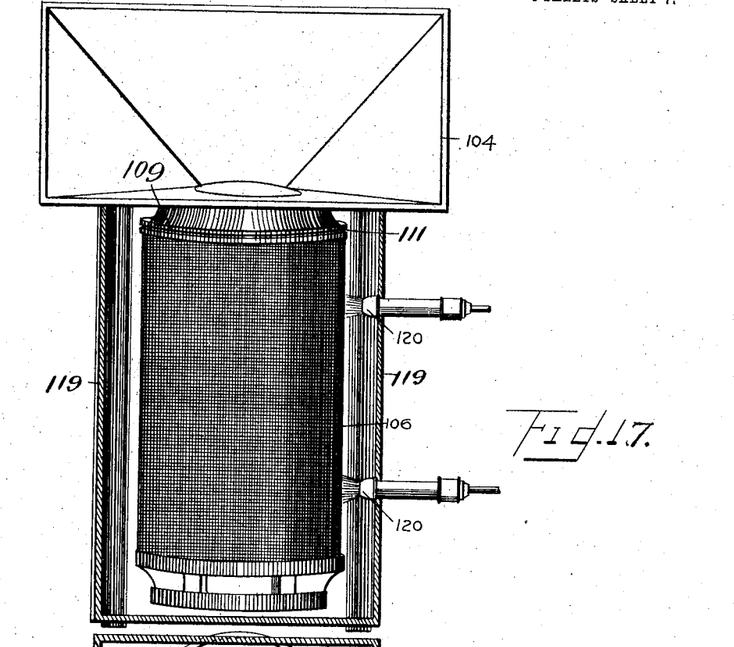
Fig. 17 is a plan section of the sand-tempering chamber, showing the screen, the screen-hopper, and the steam-injecting devices.
Figure 18:
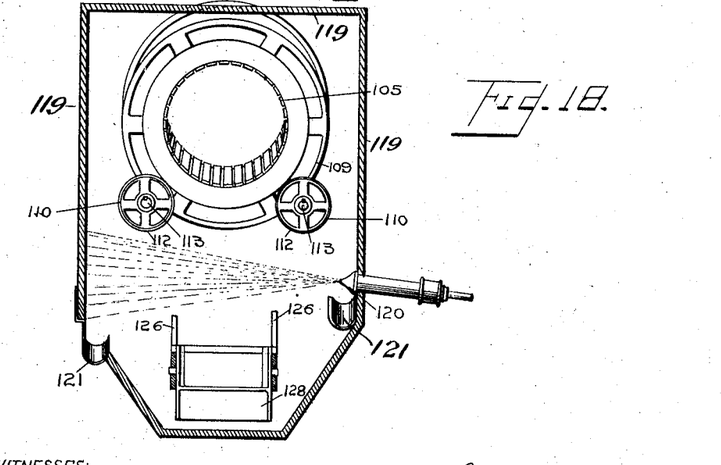
Fig. 18 is a transverse section thereof, the screen being shown in elevation.
Figures 19, 20, 21:
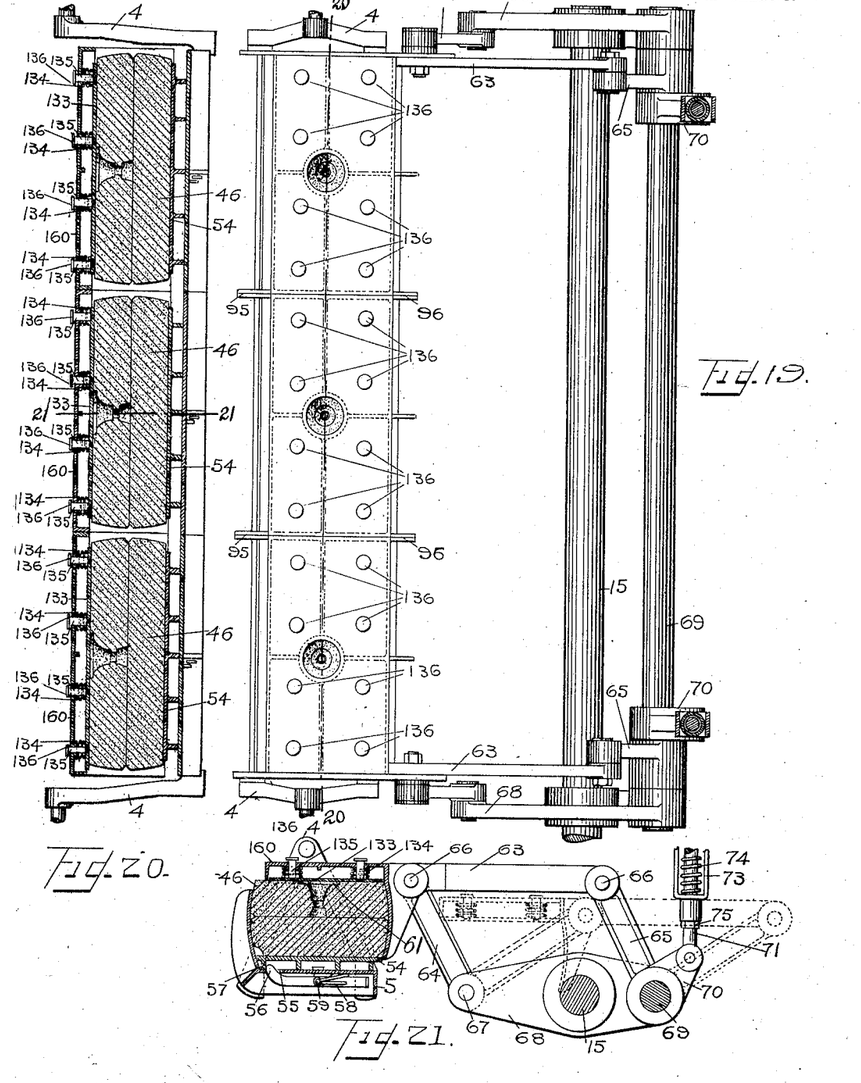
Fig. 19 is a plan view of the mold-clamp, illustrating a modified form thereof, hereinafter described.
Fig. 20 is a longitudinal sectional view thereof, taken on line 20 20, Fig. 19.
Fig. 21 is a transverse section thereof, taken on line 21 21, Fig. 19.

When the carrier strikes the trip 100, the entire mold is dumped therefrom, the bottom board, however, remaining on the carrier and going back to the post of one of the operators, where they are removed. As the mold falls from the carrier it is received in a hopper 104, which directs the sand, the castings, the cores, and core-wires into a tumbler 105, composed of a number of bars arranged in a cylindrical form with the bars extending lengthwise of the cylinder at a short distance apart and slightly inclined, as shown in Figs. 17 and 19, so as to constitute a sieve or screen, which permits the sand and the core-wires to fall through into a surrounding cylindrical sieve or screen 106, while the castings are finally ejected from the lower end of the tumbler 105 onto a chute 107, whence they are conducted to any desired point. The sand falls through the screen 106, but the core-wires are finally worked out at the end of the screen, which is also inclined like the tumbler 105, and fall onto a chute 108, which conducts them away from the machine.

The tumbler 105 and cylindrical screen 106 are connected together as one, with sufficient space between them to accommodate the sand and core-wires falling through the bars of tumbler 105, and the entire screening device thus constituted is provided at each end with a circular rim 109, and these rims are supported on driving wheels or rolls 110. As shown in Fig. 17, one of the rims 109 has a groove 111 cut therein and engaging with a flange 112 on one pair of the rollers 110 to prevent the apparatus from sliding downwardly out of engagement with the rollers. The rollers 110 at one end of the screen are connected with those at the other end by shafts 113, mounted in any suitable bearings 114, and one of these shafts is driven by gear 115, engaging the pinion 116 on pulley-shaft 117, the latter being driven by pulley 118 from any suitable source of power, preferably in unison with the movements of the mold-carriers, so that the screening apparatus will be in motion while the molds are being dumped thereinto.

The screening apparatus is preferably entirely inclosed excepting at its open ends by a casing or compartment 119, in which the sand falls from the screen 106, and as the sand comes down into this compartment in the form of a shower, as indicated in Fig. 1, it is subjected to the action of live steam through one or more nozzles or through suitable injectors or devices for admitting the steam 120, which are directed across the line of movement of the falling sand, so as to impinge directly against the sand while the latter is in a state of agitation. The water of condensation that shoots across the chamber with the steam and any condensation that may result from the steam striking the walls of chamber or casing 119 is carried off by one or more troughs 121, so that the sand will contain only so much moisture as may be produced by the steam condensing upon the individual particles or grains, which are also more or less disintegrated and intimately mingled with the steam by the force of the steam-current itself. As the sand falls into the sand compartment or chamber 119 it is gradually worked out of said chamber, preferably into chute or hopper 122, which is also closed to prevent the escape of steam and which may be provided at its bottom with a discharge-opening guarded by a gate or valve 123, adapted to be actuated by hand-wheel 124 and racks and pinions 125, as will be understood. The sand is worked out of chamber 119 by any suitable conveyer. The form shown consists of a bar 126, supported by pivoted hangers 127 and having pivoted paddles 128 of the well-known form adapted to push the sand in one direction when the bar 126 is reciprocated, which may be done by worm-shaft 129, engaging the worm-gear 130 on crank-disk 131, connected to bar 126 by pitman 132, worm-shaft 129 being driven in any suitable way, preferably in unison with the operation of the rest of the mechanism, so as to avoid the accumulation of any great amount of sand in the chamber 119.

In the modification of the mold-clamp shown in Figs. 20 to 22, inclusive, the face of the clamp, or at least the horizontal face thereof, is provided with a cushioned plate 133, pressed normally downwardly by means of springs 134 or other suitable cushions, so as to allow for any variations in the sizes of the molds. The plate 133 is guided vertically by a plurality of guide-rods 135, passing through the horizontal portion of the clamp and having heads 136 above such portion for limiting the downward movement of the plate 133. One of these plates 133 is provided for each mold, so that if the clamp should be of sufficient length for a plurality of molds and said molds should vary in size or thickness the different plates should be capable of accommodating themselves to their respective molds.

In the use of this system or apparatus the operator who places the molds upon the carriers stands at the position 45, and as the carriers rise in front of him he places the molds thereon. After receiving the molds the carriers continue upwardly over the sprocket or wheel 8 and thence horizontally to the sprocket or wheel 6 7, passing the trip 100 without interruption as the trip 100 is thrown out of engagement while the empty molds are passing it. From the sprocket 6 7 they return horizontally and descend over the sprocket 9 and behind the idler 50 to a position in front of the ladler, who stands at the point 47 and pours the metal into the mold when the latter arrives at the most convenient position. After receiving the metal the carriers descend under the main wheels or sprockets 11 12 and again pass the attendant at the position 45 in their upward course to the trip 100, which this time is thrown out to trip the filled molds and cause them to pitch into the hopper 104 in the manner shown in Fig. 1.

Having thus described my invention, what I claim as new, and desire to secure by Letters Patent, is—

1. In a foundry system, the combination of a series of mold-carriers, means for advancing said carriers intermittently, a mold-clamp provided with a pouring-aperture, and means for actuating said clamp to engage the molds as the carriers successively arrive at the clamp, substantially as set forth.

2. In a foundry system, the combination of a series of mold-carriers, means for advancing said carriers, means for successively clamping the molds thereon as the carriers advance, and means for moving said clamping means toward and from said carriers in an upright direction, said clamping means having a pouring-aperture, substantially as set forth.

3. In a foundry system, the combination of a mold-carrier, means for advancing said carrier from a position for receiving a mold to a position for pouring, a mold-clamp for pressing the top of the mold while on said carrier, means for holding said clamp away from the carrier while a mold is being placed on the carrier and means operatively connected with the carrier for moving said clamp in a downward direction toward the upper side of the carrier by the time the carrier arrives at the pouring position, said clamp being of a shape to leave the pouring-aperture of the mold exposed when the clamp is on the mold, substantially as set forth.

4. In a foundry system, the combination of a series of mold-carriers, means for advancing said carriers, means for clamping or pressing the tops of the molds on said carriers, and means for moving said clamping means toward and from the upper sides of said carriers for clamping the molds thereon during the pouring operation, said clamping means leaving the pouring-aperture of the mold exposed while the clamp is on the mold, substantially as set forth.

5. In a foundry system, the combination of a mold-carrier adapted to embrace the mold on one side and the bottom, and means for pressing the mold on the top and the opposite side in a diagonal direction, substantially as set forth.

6. In a foundry system, the combination of a mold-carrier adapted to embrace the mold on one side and on the bottom, and a clamp for embracing the mold on the opposite side and on the top, substantially as set forth.

7. In a foundry system, the combination of a mold-carrier adapted to embrace the mold on one side and on the bottom, and a downwardly and laterally movable clamp for embracing the mold on the opposite side and on the top, substantially as set forth.

8. In a foundry system, the combination of a mold-carrier adapted to embrace the mold on one side and on the bottom, a clamp for embracing the mold on the opposite side and on the top, and means for actuating said clamp, comprising a yielding member, substantially as set forth.

9. In a foundry system, the combination of a swinging mold-carrier adapted to embrace the mold on one side and on the bottom, and means for pressing against the top and opposite side of the mold while on said carrier, substantially as set forth.

10. In a foundry system, the combination of a conveyer, a series of swinging mold-carriers pivoted thereto, a mold-clamp common to all of said carriers, means for advancing said conveyer intermittently, and means for periodically moving said clamp into coöperative relation with said carriers, substantially as set forth.

11. In a foundry system, the combination of a mold-carrier, means for advancing said carrier from a position for receiving a mold to a pouring position, a clamp for pressing the top of the mold while on the carrier, and means for moving the clamp toward and from the upper side of the carrier, operatively connected with the carrier-advancing means, said clamp and clamp-actuating means having relative lost motion, whereby the said actuating means may continue to move, if necessary, after the clamp has come to rest upon the mold, substantially as set forth.

12. In a foundry system, the combination of means for supporting a mold while receiving the metal, a mold-clamp, two arms pivoted on parallel axes for supporting said clamp, a crank, elastic means for connecting said crank with one of said arms, and means for revolving said crank, substantially as set forth.

13. In a foundry system, the combination of a conveyer, a series of mold-carriers supported thereon, wheels around which said conveyer passes, a mold-clamp arranged between said wheels and adapted to move outwardly toward said carriers, and means for causing said clamp to successively engage the molds on said carriers, substantially as set forth.

14. In a foundry system, the combination of a conveyer, a series of mold-carriers supported thereon, wheels around which said conveyer passes, and a mold-clamp arranged between said wheels for engaging the molds on said carriers, said clamp being operatively related to said wheels so as to move in time therewith, substantially as set forth.

15. In a foundry system, the combination of a conveyer, a series of mold-carriers supported thereon, wheels around which said conveyer passes, an axle upon which said wheels are mounted, a mold-clamp arranged between said wheels and supported on said axle, and means for causing said clamp to successively engage the molds on said carriers, substantially as set forth.

16. In a foundry system, the combination of a conveyer, a series of mold-carriers supported thereon, wheels around which said conveyer passes, an axle upon which said wheels are mounted, bracket-arms supported on said axle, a rocker-shaft journaled in said arms, parallel arms pivoted to said bracket-arms and connected with said rocker-shaft, a mold-clamp pivotally connected with said parallel arms, and means for periodically rocking said shaft, substantially as set forth.

17. In a foundry system, the combination of a conveyer arranged in an upright position, a series of mold-carriers pivotally supported thereon, wheels around which said conveyer passes, a mold-clamp for pressing the tops of the molds on said carriers, and means for deflecting said conveyer inwardly over said wheels whereby the top of each mold will be rendered accessible to the pouring device or ladle, substantially as set forth.

18. In a foundry system, the combination of a ladler's stand, an upwardly-extending conveyer provided with swinging mold-carriers, a clamp for clamping the molds upon said carriers, wheels around which said conveyer runs, depressed with relation to said ladler's stand, and means above said wheels for deflecting said conveyer inwardly away from the ladler's stand and from over said clamp, substantially as set forth.

19. In a foundry system, the combination of a series of connected mold-carriers, wheels for advancing said carriers, a mold-clamp for engaging the molds on said carriers, and means for locking said wheels and clamp alternately, whereby one will remain inactive while the other is in operation, substantially as described.

20. In a foundry system, the combination of a series of connected mold-carriers, wheels for advancing said carriers, a mold-clamp for engaging the molds on said carriers, means for locking said wheels and clamp alternately, whereby one will remain inactive while the other is in operation, and means for locking both against operation after each has made a complete operation, substantially as set forth.

21. In a foundry system, the combination of a series of connected mold-carriers, wheels for advancing said carriers, a mold-clamp for engaging the molds on said carriers, means for locking wheels and clamp alternately, whereby one will remain inactive while the other is in operation, a driving member, a driven member operatively related to said wheels and clamp, and also to said driving member, and means for periodically disengaging the said driven and driving members, substantially as set forth.

22. In a foundry system, the combination of a series of connected mold-carriers, means for advancing said series comprising a wheel, a clutch having its driven member operatively related to said wheel, a trip for disengaging said clutch member, and means moving with said wheel for actuating said trip, substantially as set forth.

23. In a foundry system, the combination of a series of connected mold-carriers, means for advancing said series comprising a wheel, a clutch having its driven member operatively related to said wheel, a trip for disengaging said clutch member, means moving with said wheel for actuating said trip, a toggle connected to said trip, a spring supporting the joint of said toggle, and means for bending said toggle against the action of said spring for releasing said trip from the said trip-actuating means, substantially as set forth.

24. In a foundry system, the combination of a series of connected mold-carriers, rotary members over which said carriers run comprising a mutilated gear, a mutilated pinion engaging and driving said gear intermittently, and means for driving said pinion, substantially as set forth.

25. In a foundry system, the combination of a series of connected mold-carriers, rotary members over which said carriers travel comprising a mutilated gear, a mutilated pinion engaging said gear for driving it intermittently, a mold-clamping means, a mutilated pinion for actuating said means, a third mutilated pinion engaging and driving said second pinion and means for driving said third pinion in unison with said first pinion, said gear and pinions being so arranged that said first gear and pinion will be in mesh while the other two pinions are out of mesh, and vice versa, substantially as set forth.

26. In a foundry system, the combination of a series of mold-carriers, rotary members over which said carriers travel comprising a mutilated gear having a plurality of mutilations, a mutilated pinion engaging said gear for driving it intermittently, a mold-clamping means, a mutilated pinion for actuating said means, and a mutilated pinion driven in unison with said first pinion and engaging and driving said third pinion, said gear and pinions being so arranged that said first pinion and gear will be in mesh while the other two pinions are out of mesh, and vice versa, substantially as set forth.

27. In a foundry system, the combination of means for supporting a mold while the metal is being poured therein, a mold-clamp for engaging the mold while on said holding means, having a cushioned face, and means for moving said clamp toward and away from the upper side of said mold-supporting means in an upright direction, substantially as set forth.

28. In a foundry system, the combination of means for holding a plurality of molds while the metal is being poured therein, and a mold-clamp for engaging the molds while on said holding means having a plurality of independent movable cushioned faces, substantially as set forth.

29. In a foundry system, the combination of an endless series of connected independently-pivoted mold-carriers, means for advancing said carriers, a disengageable trip for engaging and tilting said carriers and thereby dumping the molds therefrom, and means arranged under said trip for separating the sand from the castings, substantially as set forth.

30. In a foundry system, the combination of a series of connected mold-carriers, a hopper arranged thereunder, means for tripping said carriers successively over and dumping the molds thereon into said hopper, a screen into which the molds pass from said hopper, a sand-compartment below said screen, and means for retempering the sand as it falls in said compartment, substantially as set forth.

31. In a foundry system, the combination of a continuous conveyer one end of which is arranged in an upright position and the other end in a horizontal position extending from the upper end of the upright part, mold-carriers carried by said conveyer, and means arranged at an elevated position under the horizontal end of said conveyer for receiving the molds and castings therefrom, substantially as set forth.

32. In a foundry system, the combination of a continuous conveyer, one end of which is arranged in an upright position and the other end in a horizontal position extending from the upper end of the upright part, pivoted mold-carriers on said conveyer, a trip for dumping said mold-carriers and means arranged at an elevated position under the horizontal part of said conveyer for receiving the molds therefrom, substantially as set forth.

GEORGE W. PACKER.

Witnesses:
F. A. HOPKINS,
D. C. GURNEE.